I Lard,
Mower.
No 4859
Patented Nov. 20. 1846
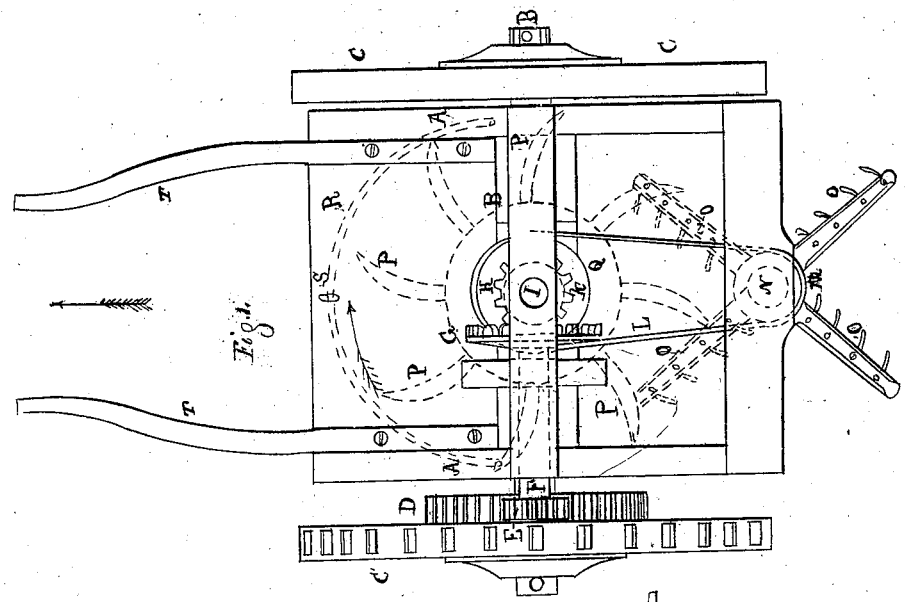
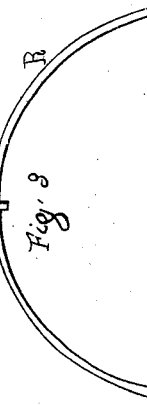
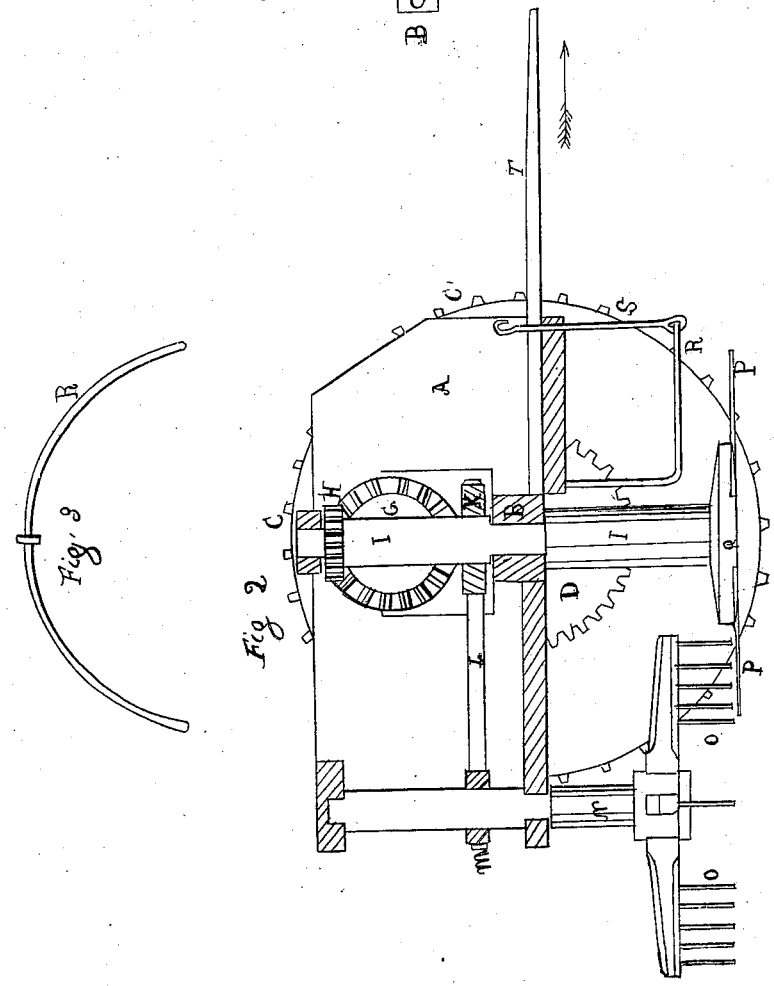

UNITED STATES PATENT OFFICE.

ISAAC LARD, OF ASHLEY, MISSOURI.

IMPROVEMENT IN MOWING-MACHINES.

Specification forming part of Letters Patent No. 4,859, dated November 20, 1846.

*To all whom it may concern:*

Be it known that I, ISAAC LARD, of Ashley, in the county of Pike and State of Missouri, have invented a new and useful Machine for Cutting Grass, which is described as follows, reference being had to the annexed drawings of the same, making part of this specification.

Figure 1 is a top view of the machine. Fig. 2 is a vertical section. Fig. 3 is a plan of the curved rod for bearing the grass from the scythes.

This machine consists of a suitable frame, A, of an oblong form, composed of horizontal, vertical, and cross timbers, mortised and tenoned together, and supported upon an axle, B, by two cart-wheels, C C′, one of them, C′, having on its side next the frame a large cog-wheel, D, which meshes into a small pinion, B, placed upon and turning with a horizontal shaft, F, on the end of which there is a vertical bevel-wheel, G, which meshes into a horizontal pinion, H, on the upper end of a vertical hanging shaft, I, turning in suitable boxes in the frame, on which there is a pulley, K, for a band, L, that leads around another pulley, M, on the hanging shaft N of the revolving rake O, designed to take the grass from the cutters P, that radiate from a circular block, wheel, or hub, Q, fixed on the lower end of the hanging shaft I first named, said hub being made of cast-iron and grooved to receive the cutters P, which are made of cast-steel, of the bill-hook shape, and inserted into said grooves, and made fast with screws or other means. In front of the cutters is arranged a curved bar of iron, R, made fast to the frame, for the purpose of bearing off the grass from the cutters, so that as the latter revolve they shall cut the grass more effectually, having a link or bar of iron, S, extending vertically upward from it to the frame, by which it is raised or lowered to suit the kind of grass to be cut. One of the cart wheels, C′, has points in its circumference for preventing slipping on the ground. The frame is provided with sides and shafts, by which the whole machine is moved forward.

Operation: The animal to draw the machine, being geared to the machine between the shafts T, is driven forward. The spurs or points in the periphery of the propelling or cart wheel C′ take hold of the ground and cause it to turn, and also the cog-wheel D, affixed to the side thereof, which cog-wheel D meshes into the pinion E, causing it to turn with the cog-wheel G upon it, and said cog-wheel G meshes into the cog-wheel H upon the upper end of the shaft I, causing the shaft I to revolve, and with it the hub Q and cutters P, which cut the grass. While this operation is going on a revolving rake is made to receive a horizontal revolving motion, and to take the grass from the cutters and deposit it in windrows by means of a band, L, and pulleys M and N. The guard R bears the grass off from the cutters, as stated above, causing it to assume a proper position for being cut down effectually.

What I claim as my invention, and desire to secure by Letters Patent, is—

1. The arrangement of the revolving rake for taking the grass from the scythes as fast as cut and depositing it in the rear, in combination with the revolving scythes, arranged and operated in the manner and for the purpose above set forth.

2. The arrangement of the curved bar for bearing off the heads of the grass to enable the cutters to cut the grass more effectually, in combination with the frame, as set forth.

ISAAC LARD.

Witnesses:
WM. P. ELLIOTT,
ALBERT E. H. JOHNSON.